United States Patent
Bremmer et al.

(10) Patent No.: US 9,539,769 B2
(45) Date of Patent: Jan. 10, 2017

(54) COMPOSITE STRUCTURE AND CORE POSITIONING PLY

(75) Inventors: Jonathan Bremmer, Glastonbury, CT (US); Jeffrey G. Sauer, Woodbury, CT (US); Edward Joseph Fabian, Oxford, CT (US); Paul H. Denavit, Woodbridge, CT (US); Darryl Mark Toni, Madison, CT (US); William E. Hovan, III, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1080 days.

(21) Appl. No.: 13/274,690

(22) Filed: Oct. 17, 2011

(65) Prior Publication Data

US 2013/0095284 A1    Apr. 18, 2013

(51) Int. Cl.

| B32B 3/12 | (2006.01) |
|---|---|
| B29C 70/30 | (2006.01) |
| B29C 70/34 | (2006.01) |
| B29C 70/86 | (2006.01) |
| B29C 65/00 | (2006.01) |
| B29C 65/48 | (2006.01) |

(52) U.S. Cl.
CPC .............. *B29C 70/34* (2013.01); *B29C 70/865* (2013.01); *B32B 3/12* (2013.01); *B29C 65/00* (2013.01); *B29C 65/483* (2013.01); *B29C 66/1142* (2013.01); *B29C 66/721* (2013.01); *B29C 70/30* (2013.01); *B29C 70/342* (2013.01); *Y10T 428/24149* (2015.01)

(58) Field of Classification Search
CPC ........ B29C 70/30; B29C 70/34; B29C 70/865; B29C 66/1142; B29C 66/721; B29C 65/00; B29C 65/483; B29C 70/342; B32B 3/12; Y10T 428/241149
USPC ......................................................... 156/245
See application file for complete search history.

(56) References Cited

U.S. PATENT DOCUMENTS

| 4,120,632 A | 10/1978 | Stoeberl |
|---|---|---|
| 5,116,216 A | 5/1992 | Cochran et al. |
| 5,557,831 A * | 9/1996 | Kishi et al. ..................... 28/167 |
| 5,576,030 A | 11/1996 | Hooper |
| 5,876,546 A * | 3/1999 | Cloud ........................... 156/212 |
| 6,475,596 B2 * | 11/2002 | Hsiao et al. .................. 428/116 |
| 6,743,504 B1 * | 6/2004 | Allen et al. ................... 428/362 |
| 7,413,694 B2 | 8/2008 | Waldrop, III et al. |
| 2006/0172111 A1 * | 8/2006 | Polus .................... B29C 70/088 428/73 |
| 2008/0220112 A1 | 9/2008 | Waldrop et al. |
| 2009/0155524 A1 * | 6/2009 | Rapp .................... B29C 70/086 428/116 |

(Continued)

Primary Examiner — Philip Tucker
Assistant Examiner — Vicki Wu
(74) Attorney, Agent, or Firm — Cantor Colburn LLP

(57) ABSTRACT

A composite structure includes a first laminate, a second laminate, and at least one core component located between the first laminate and the second laminate. The at least one core component includes a honeycomb core and at least one locking ply extending from the honeycomb core between the first laminate and the second laminate. The at least one locking ply is configured such that a pressure applied during a cure cycle of the composite structure retains the at least one locking ply between the first laminate and the second laminate thereby preventing movement of core component.

5 Claims, 4 Drawing Sheets

(56) References Cited

U.S. PATENT DOCUMENTS

2010/0323150 A1* 12/2010 Weimer ................ B29C 70/088
                                                            428/116
2012/0199292 A1* 8/2012 Bremmer et al. ............ 156/559
2012/0255676 A1* 10/2012 Bremmer et al. ............ 156/285
2013/0344295 A1* 12/2013 Bremmer et al. ............ 428/174
2014/0106116 A1* 4/2014 Bremmer et al. ............ 428/117

* cited by examiner

COMPOSITE STRUCTURE AND CORE POSITIONING PLY

FEDERAL RESEARCH STATEMENT

This invention was made with Government support under N00019-06-C-0081 awarded by the Department of the Navy. The Government has certain rights in this invention.

BACKGROUND OF THE INVENTION

The subject matter disclosed herein relates to the manufacture of honeycomb composite structures.

Honeycomb composite structures are typically fabricated having one or more laminate structures formed from a selected number of plies, and one or more core elements, which are often honeycomb core elements. The core elements are bonded to the laminate structures under a cure cycle involving pressure and/or high temperature applied to the composite. The pressurization during the cure cycle in many structures causes movement of the honeycomb core elements so the resulting composite structure is not what was intended by design. Further, in some structures, the core elements may be crushed due to the movement.

BRIEF DESCRIPTION OF THE INVENTION

According to one aspect of the invention, a composite structure includes a first laminate, a second laminate, and at least one core component located between the first laminate and the second laminate. The at least one core component includes a honeycomb core and at least one locking ply extending from the honeycomb core between the first laminate and the second laminate. The at least one locking ply is configured such that a pressure applied during a cure cycle of the composite structure retains the at least one locking ply between the first laminate and the second laminate thereby preventing movement of core component.

According to another aspect of the invention, a method of forming a composite structure includes positioning a first laminate in a molding tool and positioning a core element in the molding tool, the core element including at least one locking ply extending therefrom. A second laminate is positioned over the core element and a pressure is applied to the second laminate thereby retaining the at least one locking ply between the first laminate and the second laminate and preventing movement of the core element.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
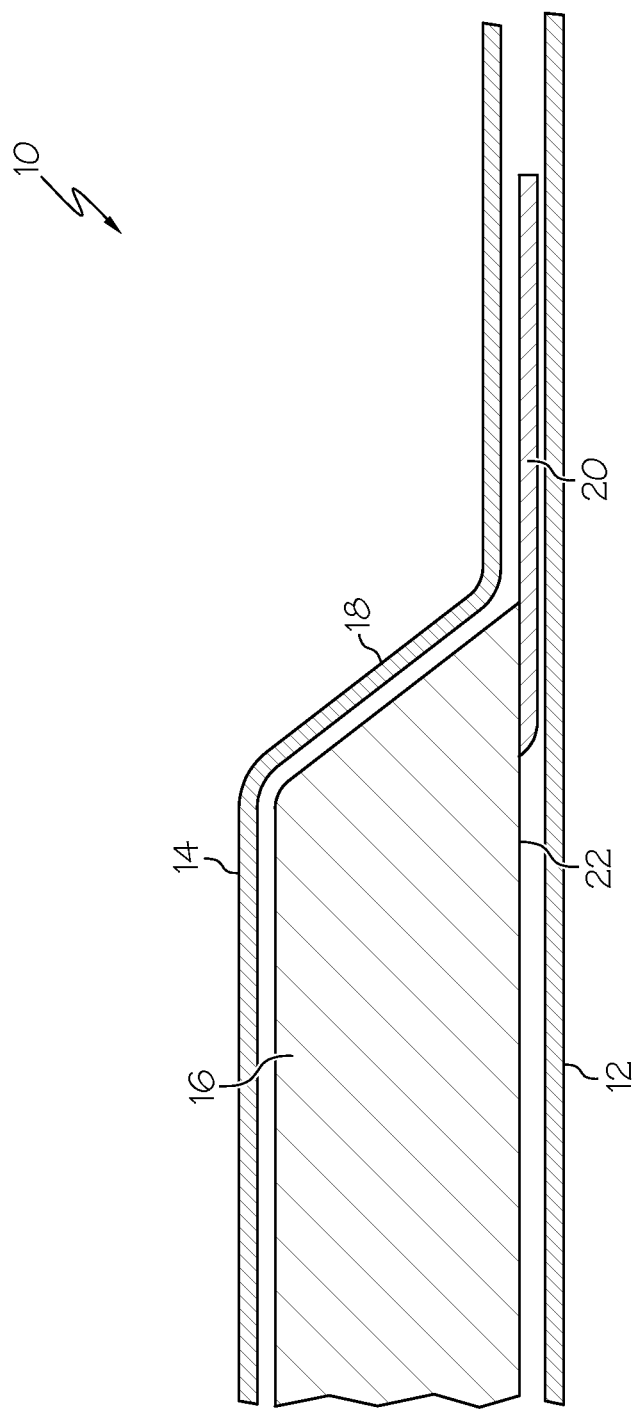
FIG. 1 is a cross-sectional view of an embodiment of a composite structure.

Shown in FIG. 1 is cross-sectional view of an embodiment of a composite structure 10. The composite structure 10 includes a first laminate 12 and a second laminate 14. The first and second laminates 12, 14 are formed of a plurality of plies of, for example, prepreg or wet layup fabric, and the fabric may be fiberglass, graphite, or any suitable material.

At least one core component 16, for example, a honeycomb core, is located between the first laminate 12 and the second laminate 14, with one or both of the laminates 12, 14 having a ramp 18, or step, or other feature to allow for placement of the core component 16 between the first and second laminates 12, 14. Typically, when such a core component is cured between two laminates, pressure of the cure cycle causes movement of the core component. To prevent such movement, a locking ply 20 or plies are provided. The locking ply 20 may be, for example, prepreg or wet layup fabric, and is secured to the core component 16 by, for example, co-curing or pre-curing with the core component 16. The locking ply 20 extends outwardly from, for example, a base 22 of the core component 16. It is to be appreciated, however, that geometry and configuration of the composite structure 10 determines where on the core component 16 the locking ply 20 extends from. In some embodiments, as shown, the locking ply 20 extends from the core component 16 to be positioned directly between the first laminate 12 and the second laminate 14.

Figure 2:
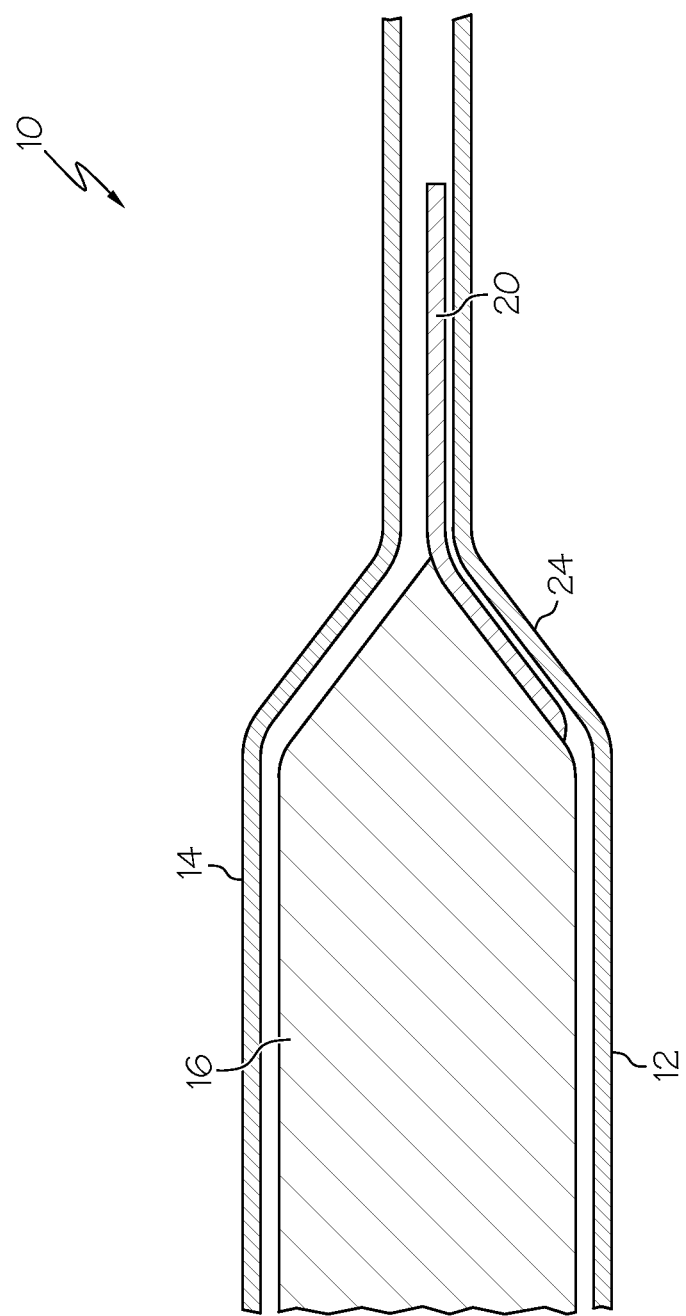
FIG. 2 is a cross-sectional view of another embodiment of a composite structure.
Figure 3:
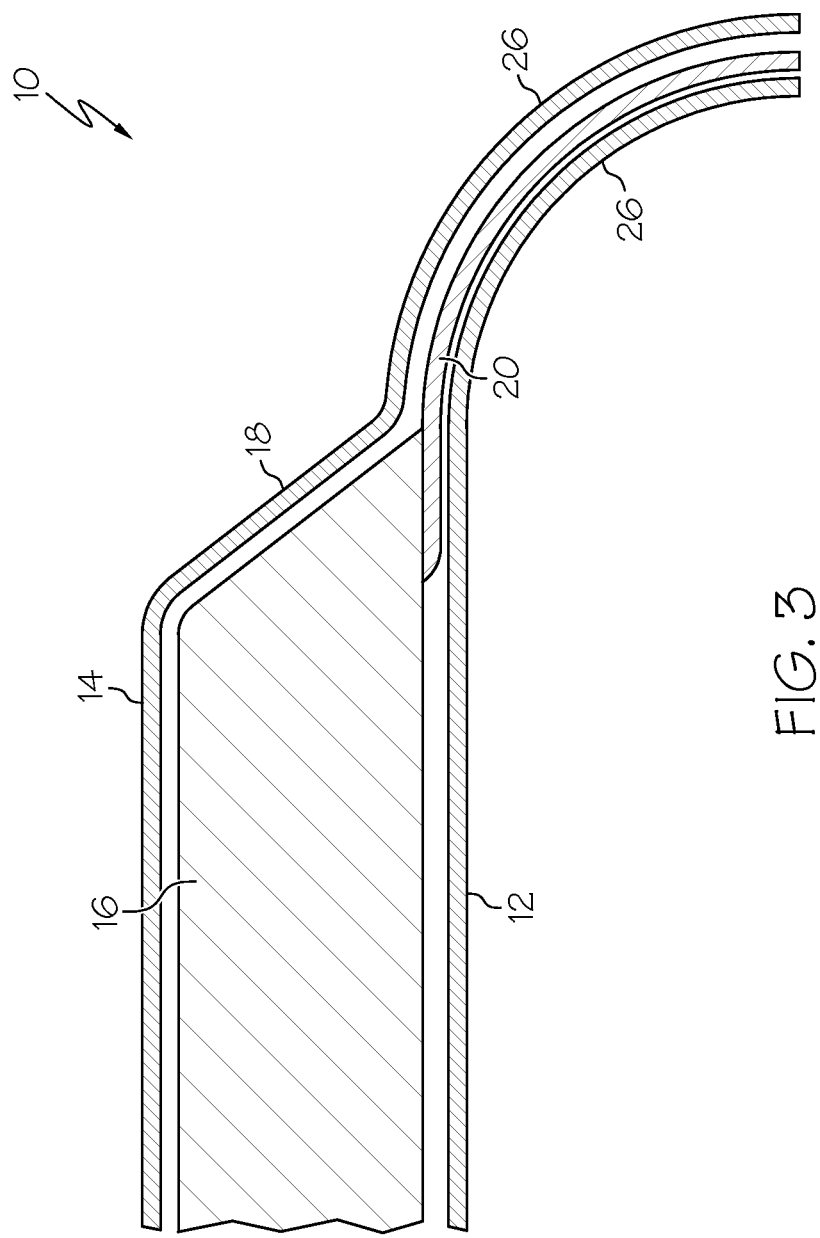
FIG. 3 is a cross-sectional view of yet another embodiment of a composite structure.

Referring to FIG. 2, the use of locking ply 20 is not restricted to a flat shape. For example, locking ply 20 may be used where the first or second laminate 12, 14 has a drop off portion 24, or as shown in FIG. 3, where the first or second laminate 12, 14 has a curvature 26 which the locking ply 20 is formed to conform to.

Figure 4:
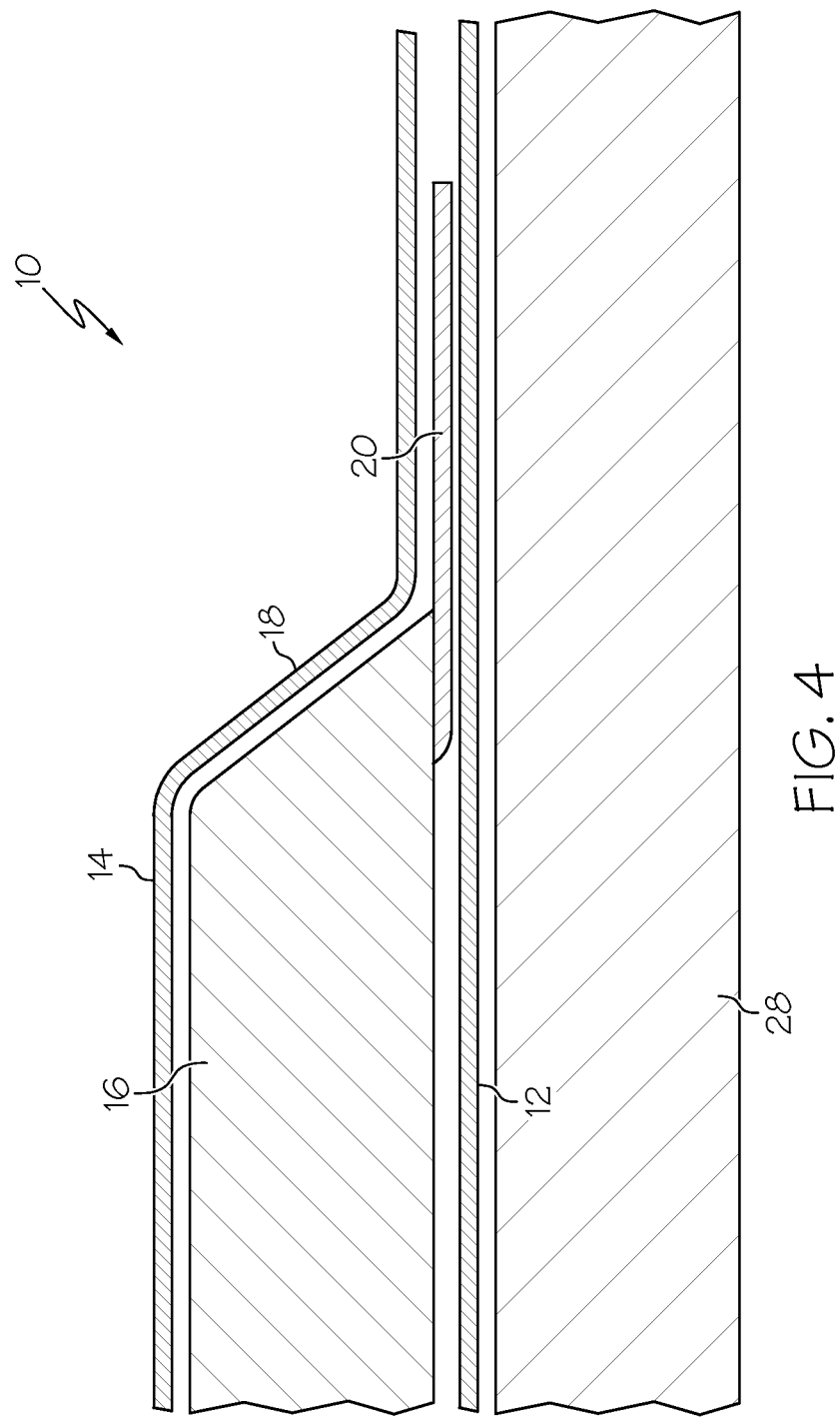
FIG. 4 is a cross-sectional view of an embodiment of a composite structure in a molding tool.

Referring now to FIG. 4, when manufacturing the composite structure 10, the first laminate 12 is placed in a molding tool 28. The core component 16 is placed in the first laminate 12 with the locking ply 20 extended in the selected direction. The second laminate 14 is then placed in the molding tool 28 over the core component 16 and locking ply 20 and the first laminate 12. Pressure is applied to cure the laminates 12, 14 and the core component 16 together. When the pressure is applied, the position of the core component 16 is maintained since the locking ply 20, secured to the core component 16, is held between the first laminate 12 and the second laminate 14. Use of the locking ply 20 thus prevents movement of the core component 16 from its desired location, and the resulting core crush due to misplacement of the core component 16. Since the core component 16 is maintained in the desired position, the cure cycle pressure can be increased without causing core crush. For example, in some cure cycles, the pressure may be increased to about 65 psi when using the locking ply 20, as compared to a cure cycle pressure of 45-50 psi without the locking ply. The increase in cure cycle pressure results in improved bonding properties of the resulting composite structure 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of forming a composite structure comprising:
   positioning a first laminate in a molding tool;
   co-curing at least one locking ply to a honeycomb core element;
   positioning the honeycomb core element and the at least one locking ply co-cured to the honeycomb core element in the molding tool;
   positioning a second laminate over the core element, wherein the at least one locking ply extends outwardly from said honeycomb core element such that a portion of the at least one locking ply is positioned directly between the first laminate and the second laminate; and
   applying pressure to the second laminate thereby retaining the at least one locking ply between the first laminate and the second laminate and preventing movement of the core element.

2. The method of claim 1, wherein the at least one locking ply is two or more locking plies.

3. The method of claim 1, wherein the at least one locking ply is one of a prepreg or wet layup material.

4. The method of claim 1, wherein the at least one locking ply is retained directly between the first laminate and the second laminate.

5. The method of claim 1, wherein the pressure is about 65 psi.

* * * * *